United States Patent
Audet

(10) Patent No.: US 8,010,892 B2
(45) Date of Patent: Aug. 30, 2011

(54) DOCUMENTS NOTATION TOOL AND METHOD

(75) Inventor: Mathieu Audet, Montreal (CA)

(73) Assignee: Maya-Systems Inc., Montreal, Quebec (CA)

( * ) Notice: Subject to any disclaimer, the term of this patent is extended or adjusted under 35 U.S.C. 154(b) by 929 days.

(21) Appl. No.: 11/943,558

(22) Filed: Nov. 20, 2007

(65) Prior Publication Data

US 2009/0070662 A1    Mar. 12, 2009

Related U.S. Application Data

(60) Provisional application No. 60/957,444, filed on Aug. 22, 2007, provisional application No. 60/971,214, filed on Sep. 10, 2007.

(51) Int. Cl.
*G06F 17/21* (2006.01)
(52) U.S. Cl. .................................................. 715/243
(58) Field of Classification Search .................. 715/243
See application file for complete search history.

(56) References Cited

U.S. PATENT DOCUMENTS

| | | | |
|---|---|---|---|
| 6,275,229 B1* | 8/2001 | Weiner et al. ................. | 715/764 |
| 6,987,220 B2* | 1/2006 | Holcombe ................. | 84/483.2 |
| 2003/0167902 A1* | 9/2003 | Hiner et al. ................. | 84/477 R |
| 2007/0216694 A1 | 9/2007 | Audet | |
| 2008/0022199 A1* | 1/2008 | Sako et al. ................. | 715/273 |
| 2008/0058106 A1 | 3/2008 | Audet et al. | |
| 2008/0071822 A1 | 3/2008 | Audet et al. | |
| 2008/0092038 A1 | 4/2008 | Audet | |
| 2008/0134013 A1 | 6/2008 | Audet | |
| 2008/0134022 A1 | 6/2008 | Audet | |
| 2008/0141115 A1 | 6/2008 | Audet | |

FOREIGN PATENT DOCUMENTS

WO  WO 2007/109890   10/2007

* cited by examiner

*Primary Examiner* — Laurie Ries
*Assistant Examiner* — Tionna Smith
(74) *Attorney, Agent, or Firm* — Mathieu Audet

(57) ABSTRACT

A computer-readable medium having computer executable components is disclosed, the components comprising a plurality of staff lines and intervening spaces adapted to display a plurality of documents positioned along the plurality of staffs and intervening spaces.

19 Claims, 16 Drawing Sheets

| Characterization attributes desc. | Staff | Visible | Avail. to client | Shared | Color | Shading | Size | Frame | Animation | Alignment |
|---|---|---|---|---|---|---|---|---|---|---|
| Communications to patent office | #1 | yes | yes | Paralegal no.2 | | | Normal | | | Above |
| .Declaration | .#1 | yes | yes | Paralegal no.2 | | | Normal | | | Above |
| .Power of Attorney | .#1 | yes | yes | Paralegal no.2 | | | Normal | | | Above |
| .Assignment | .#1 | yes | yes | Paralegal no.2 | Blue | | Normal | | | Above |
| .Information disclosure statement | .#1 | yes | yes | Paralegal no.2 | | | Normal | | | Above |
| Comminication from patent office | #1 | yes | yes | Paralegal no.2 | | | Normal | | | Below |
| .Filing receipt | .#1 | yes | yes | Paralegal no.2 | | | Normal | | | Below |
| .Notice of missing parts | .#1 | yes | yes | Paralegal no.2 | | | Normal | Bold | | Below |
| .Assignment recordation receipt | .#1 | yes | yes | Paralegal no.2 | | | Normal | Red | | Below |
| Application as filed | #2 | yes | yes | Agents nos.4,5,8 | | | Normal | | | Above |
| .Specification | | no | | | | | | | | |
| ..Background | | no | | | | | | | | |
| ..Summary | | no | | | | | | | | |
| ..Description | | no | | | | | | | | |
| ..Claims | | no | | | | | | | | |
| ..Abstract | | no | | | | | | | | |
| Drawings | #2 | yes | yes | Agents nos.4,5,15 | | | Normal | | | Centered |
| .Marked-up versions | | no | | | | | | | | |
| Communications to client | #3 | yes | yes | Paralegal no.2 | | | Normal | | | Above |
| Communications from client | #3 | yes | yes | Paralegal no.2 | | | Normal | | | Below |
| Communications from other law firm | #3 | yes | no | none | | | Normal | | Bouncing | Centered |
| Email | | yes | yes | all | | | Normal | | | |
| PDF | | yes | yes | all | | ///////////// | Small | | | |
| DOC | | yes | yes | all | | | Normal | | | |
| JPG | | yes | yes | all | | | Normal | | | |
| Deadline within 2 weeks | | yes | no | no | red | | Large | | Vibrating | n/a |

Figure 15

| | 950 | 952 | 954 | 956 | 958 | 960 | 962 | 964 | 966 | 968 | 970 |
|---|---|---|---|---|---|---|---|---|---|---|---|
| Characterization attributes descrip | Staff | Visible | Avail. to client | Shared | Color | Shading | Size | Frame | Animation | Alignment |
| Engine | #1 | yes | yes | Engineering | | | Normal | | | |
| .Connecting rod | .#1 | yes | yes | | | | | | | |
| ..Crank shaft | | no | yes | | | | | | | |
| .Piston | | no | yes | | | | | | | |
| Transmission | #2 | yes | yes | Engineering | | | Normal | | | |
| .Drive shaft | | no | yes | | | | | | | |
| .Gearbox | | no | yes | | | | | | | |
| .Type | | no | yes | | | | | | | |
| ..Automatic | | no | yes | | | | | | | |
| ..CVT | ..#2 | yes | yes | Engineering | | | Larger | | | |
| ..Manual | | no | yes | | | | | | | |
| Exhaust system | | no | yes | | | | | | | |
| .Catalyst | | no | yes | | | | | | | |
| .Muffler | | no | yes | | | | | | | |
| Patents | | no | yes | | | | | | | |
| .Assignee | | no | yes | | | | | | | |
| ..Honda | | yes | yes | Engineering | | | Normal | | | Above |
| ..Yamaha | | yes | yes | | | | | | | |
| ..Our own patents | #3 | yes | yes | Management | | | Normal | | | |
| .Country | | yes | yes | all | | | Normal | | | |
| ..EP | | no | yes | | | | | | | |
| ..US | | yes | yes | all | | | Normal | Bold | | |
| .Expired | | yes | yes | all | Green | | Normal | | | |
| .Reinstatable | | yes | yes | all | | | Normal | | Flashing | |
| .Main US Class | | no | yes | | | | | | | |
| PDF | | yes | yes | all | | ///////// | Normal | | | |
| DOC | | no | no | | | | | | | |
| Viewed in the past week | | no | no | | | | | | | |
| Viewed by "Shared" | | yes | no | | | | Normal | Blue | | |

Figure 16

DOCUMENTS NOTATION TOOL AND METHOD

CROSS-REFERENCE

This U.S. patent application relates to and claims priority on U.S. patent application Ser. No. 11/774,591, filed Jul. 7, 2007, entitled DOCUMENTS LOCATING SYSTEM AND METHOD, relates to and claims priority on provisional application No. 60/957,444, filed Aug. 22, 2007, entitled DOCUMENTS LOCATING SYSTEM AND METHOD, relates to and claims priority on U.S. provisional application No. 60/971,214, filed Sep. 10, 2007, entitled GEOGRAPHICAL LOCATING SYSTEM AND METHOD, relates to and claims priority on U.S. patent application Ser. No. 11/693,669, filed Mar. 29, 2007, entitled MULTI-DIMENSIONAL LOCATING SYSTEM AND METHOD, relates to and claims priority on U.S. patent application Ser. No. 11/754,219, filed May 25, 2007, entitled TIME SCALE FOR REPRESENTING INFORMATION, relates to and claims priority on U.S. patent application Ser. No. 11/936,129, filed Nov. 7, 2007, entitled MULTI-DIMENSIONAL LOCATING GAME SYSTEM AND METHOD, and also relates to and claims priority on U.S. patent application Ser. No. 11/885,120, filed Sep. 13, 2007, entitled DOCUMENTS LOCATING SYSTEM AND METHOD. All these documents are enclosed herewith by reference.

BACKGROUND OF THE INVENTION

1. Field of the Invention

This invention relates to a notation tool and method for organizing documents and specifically relates to classifying documents with a computerized system.

2. Description of Related Art

The availability of computer systems and networks has multiplied access to information. Given the always-increasing number of documents of all kinds computer systems' users have difficulties keeping organized. Emails, word processing documents, web pages, digital pictures, digital music and spreadsheets therefore flood users with digital information. We even reached a level where there is so much documents to be managed the current tools are not working adequately anymore.

Document classification and management systems that are available on the market have difficulties presenting documents in an intuitive manner. Mostly, users of computer systems have to rely on listings of document names and titles. Sometimes a preview of the document is provided although it is not included in a contextual environment that can provide the user of the computer system some perspective about the document.

It is even more difficult to manage a large number of documents. One reason is that listings cannot be made too small without loosing the ability to read them. That means the amount of information that can be displayed at the same time is quite limited with current displays.

The large volume of information raises a structural issue. There is no real method or standard how to organize and structure large quantities of documents with a computerized tool. As mentioned above, we still need to rely on lists of documents although they provide documents renderings that have been developed in accordance with what the computer industry was capable of doing a while ago and are still not providing the information in an intuitive manner for a human.

Modern taxonomy, or text categorization, is generated by manually defining a set of rules, which encode expert knowledge on how to classify documents in a predetermined set of categories. This is a complicated burden and does hardly assist a computer user to quickly get a big picture of the documents. We are missing a simple and intuitive way to present a large amount of documents.

More precisely, a "document management grammar" that provides a set of rules that defines the structure of document management is still missing in this new field of massive information management. Also, a "document management syntax" enabling a connected or orderly information organization system presenting documents in a harmonious arrangement has yet to be developed.

Another way of seeing it is to refer to the universal language of written music. The juxtaposed five staff lines and intervening spaces provide a universal musical syntax that is used across the world to communicate any kind of music and it did so for ages. In a simple look a musician can appreciate and understand what should be played. We stand nowhere close to this efficient music communication tool when we come back to our clogged email inbox or our hard drive.

Therefore, there exists a need in the art for an improved manner for organizing documents with a computer system. There is a need in the art for such a document management tool that would provide sort of a document organization "grammar and syntax". And, there is a need in the art for such a document organizing tool which can be easily and intuitively understood.

SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the objects and aspects disclosed in a simplified form, as an introduction to the more detailed description that is presented later.

It is one object of the present invention to alleviate one or more of the drawbacks of the background art by addressing one or more of the existing needs in the art.

Accordingly, one object of one or more embodiments of this invention provides a tool to organize documents on a computerized machine.

According to one other object of the present invention is provided a tool and a method for managing documents that is inspired from the fundamental latticework of a musical score, upon which documents are positioned.

Another object of one or more embodiments of the present invention provides a graphical tool enabling classification and organization of documents in a virtual environment.

Another object of one or more embodiments of the present invention provides a document management tool and method for graphically representing groups of documents in a virtual environment.

Another object of one or more embodiments of the present invention provides a tool and a method for displaying groups of documents using visible and/or transparent staffs and spaces analogous to music notation.

According to a further object of one or more of these embodiments is provided a tool and a method for displaying graphical representations of documents along a series of visible and/or transparent staffs along a timeline.

According to a further aspect of one or more of these embodiments, the graphical representation of the documents can use a variety of shapes, colors, alignments and sizes.

Yet another aspect of the present invention provides a computer-readable medium having computer executable instructions enabling a grammar for organizing documents, the grammar comprising a plurality of staff lines defining a timeline, at least one staff line being associated with a document attribute, a plurality of documents, each documents being associated with at least one document attribute, wherein some documents from the plurality of documents are disposed about a staff line associated with a common document attribute; and a link between two documents having a commonality.

Another aspect of the present invention provides a computer-readable medium having computer executable instructions enabling a method for organizing documents, the method comprising associating a first staff line with a first document attribute; enabling a plurality of documents to be displayed along the first staff line, each document displayed along the first staff line having the first document attribute in common; associating a second staff line with a second document attribute; and enabling a plurality of documents to be displayed along the second staff line, each document displayed along the second staff line having the second document attribute in common, wherein the first staff line and the second staff line are parallel one to the other and define a timeline.

Another aspect of one or more embodiments of the present invention provides a computer-readable medium having computer executable components comprising a plurality of staff lines and intervening spaces adapted to display a plurality of documents positioned along one of the plurality of staff lines and intervening spaces.

Yet another aspect of the present invention provides a method for organizing documents comprising enabling a plurality of staff lines and intervening spaces, and displaying a plurality of documents positioned about the plurality of staff lines and intervening spaces. A computer-readable medium having computer executable instructions enabling a syntax for organizing documents, the syntax comprising:

An aspect of the present invention provides a computer-readable medium having computer executable instructions enabling a plurality of staff lines, at least one staff line being associable with a document attribute and adapted to display a plurality of documents associated with the document attribute.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

For a better understanding of the present invention as well as other objects and further features thereof, reference is made to the following description which is to be used in conjunction with the accompanying drawings, where:

FIG. 15 depicts a combination of document attributes, distinctive visual features and conditions applied to patent prosecution documents according to an embodiment of the present invention; and FIG. 16 depicts a combination of document attributes, distinctive visual features and conditions applied to patent prior art management according to an embodiment of the present invention.

DETAILED DESCRIPTION OF PREFERRED EMBODIMENTS

A preferred embodiment of the present invention is described below with reference to the drawings.

Staff Based Notation Applied to Music

Modern musical notation includes symbols and marks that are widely used in musical scores of all styles and instruments today. The musical notation is an efficient and universal way to transmit knowledge about music in a unified visual fashion.

Figure 1:
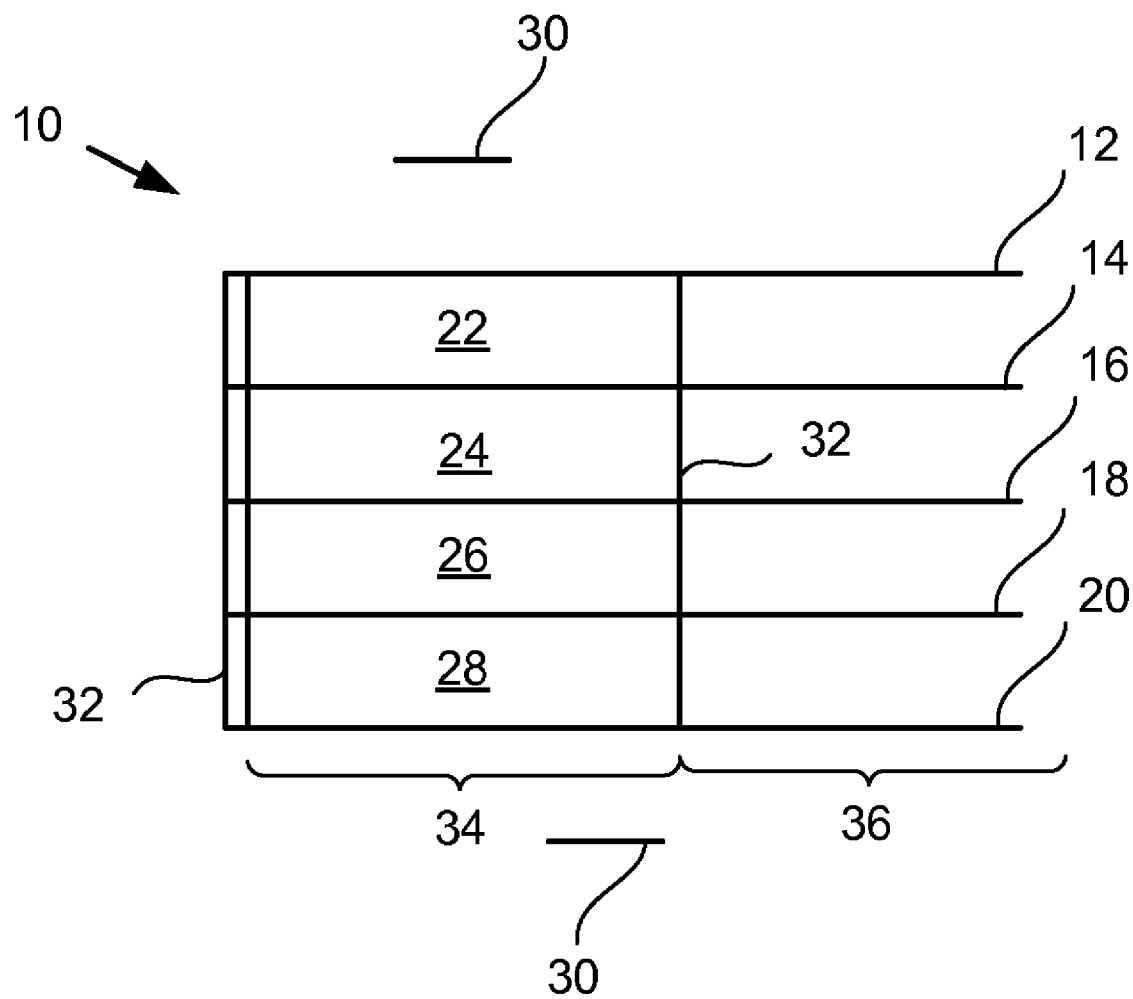
FIG. 1 is a schematic representation of a staff as commonly seen with music notation.

Referring to FIG. 1, the musical notation includes a music staff 10 with five staff lines 12, 14, 16, 18, 20 equally disposed from one another. The staff 10 is the fundamental latticework of a musical score, upon which symbols (not shown) are placed. The five staff lines 12, 14, 16, 18, 20 and intervening spaces 22, 24, 26, 28, each correspond to the seven repeating pitches of the diatonic scale, as defined by the clef. For example, on a staff with a treble clef, the bottom staff line is assigned to E above middle C (E4 in note-octave notation). The space above it is F4, and so on. A common use of the staff is the grand staff (not shown), which combines bass and treble into one system, joined by a brace, and used or keyboard music notation (also called a Stave).

Leger lines 30 are used to extend the staff 10 if any pitches fall above or below it. Such leger lines are placed behind the note heads, and extend a small distance to each side. Four superposed leger lines 30 is the practical limit for most situations.

Bar lines 32 are used to separate two measures 34, 36 on a staff 10. Bar lines 32 are extended to connect the upper and lower staffs 10 of a grand staff (not shown).

Notes and rests values (not shown) are not absolutely defined, but are proportional in duration to all other note and rest values. Notes are disposed on the staff on the right place to correspond to the desired frequency. Notes and silence have various duration known under the following names: longa (6R), breve (8R), semibreve (4R), minim (2R), crotchet (1R), quaver (½R), semiquaver (¼R), demisemiquaver (⅛R), hemidemisemiquaver (1/16R), quasihemidemisemiquaver (1/32R), beamed notes and dotted note.

Staff Based Notation Applied to Documents

The present invention uses a staff like environment and disposes documents on it as opposed to notes and rests values. Similarly with music, the documents are most commonly longitudinally disposed on the staff according to time although the longitudinal direction can be associated with other criterion that will be discussed later.

Figure 2:
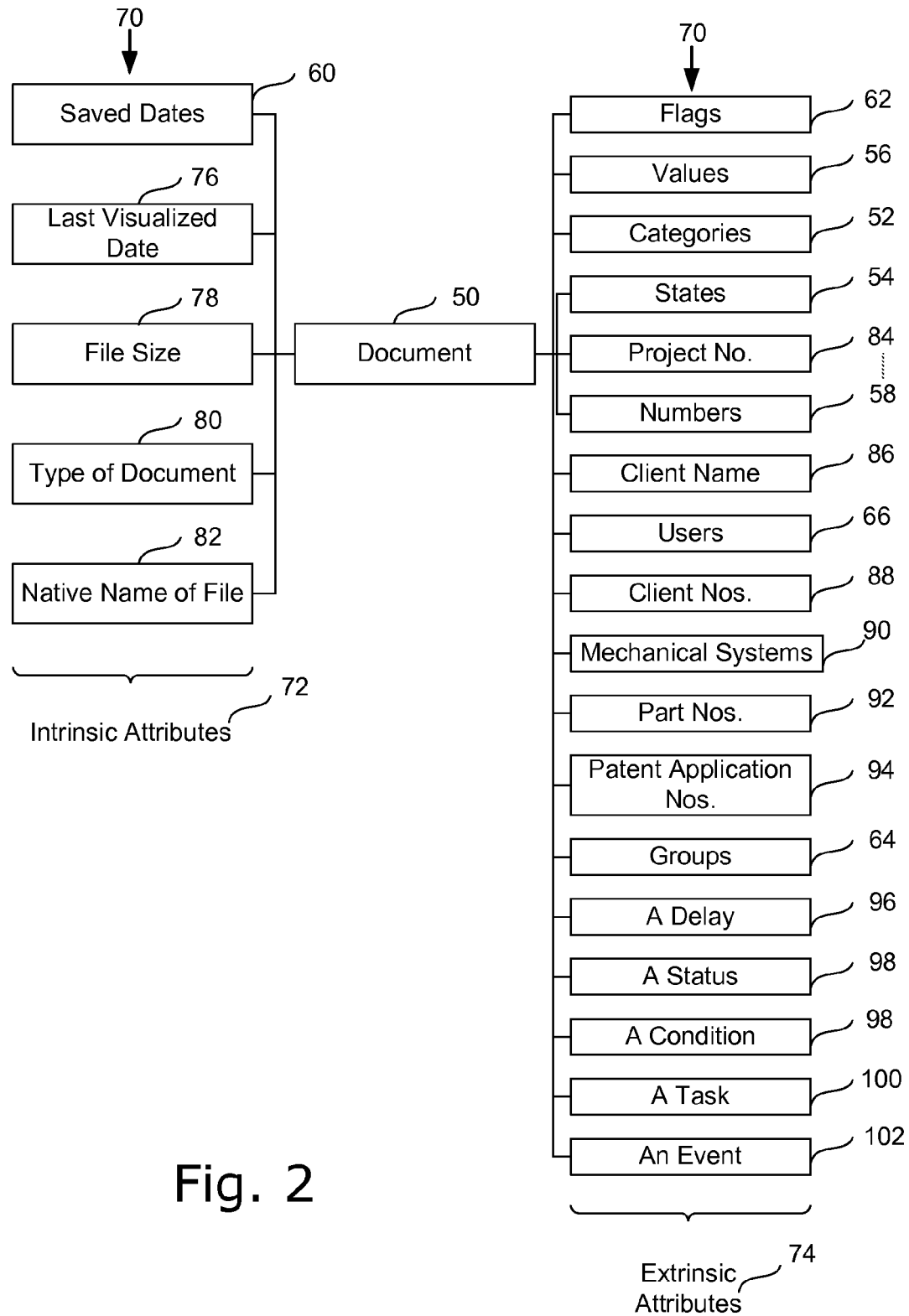
FIG. 2 is a schematic representation of a document and its possible related document attributes.

As shown on FIG. 2, each document 50 is associated with a number of categories 52, states 54, values 56, numbers 58, dates 60, flags 62, groups 64 and/or users 66 that are collectively called document attributes 70. In other words, a document attribute 70 helps to further define the meaning and the relationships of a particular document. Each document 50 can be associated with one or more document attributes 70. The list of document attributes 70 can vary from one application to another so the list of document attributes 70 is not exhaustive.

Some document attributes 70 are considered intrinsic attributes 72 because they do not require the user to be involved into the association of the attributes 70 that are already associated in some ways with the document 70 file. The association between the document attribute 72 and the document 50 can be made with the form of metadata or other. For example, intrinsic attributes 72 can be the last saved date 60, the last visualized date 76, the size of the file/document 78, the type of the file 80, the native name of the file 82 . . . Conversely, extrinsic document attributes 74 require the user to associate the document attribute 74 with the document 50. This is because extrinsic attributes 74 are created and developed separately to draw a relationship between the document 50 and something external to the document 50. For example, a category 52, a project number 84, a client name 86, a client number 88, a mechanical system 90, a part number 92, an patent application number 94, a delay 96, a status 98, a condition 100, a task 100, an event 102 and so on. They are all extrinsic document attributes 74 drawing more relations between the document 50 and the meaning it has for its creator/owner/company i.e. the person recording it, the office file numbers, the client's files number, the patent office numbering system, etc. More details about document attributes can be found in United States patent application published number US 2007/0214169A1 and published on Sep. 13, 2007. This published patent application is incorporated herein by reference.

Figure 3:
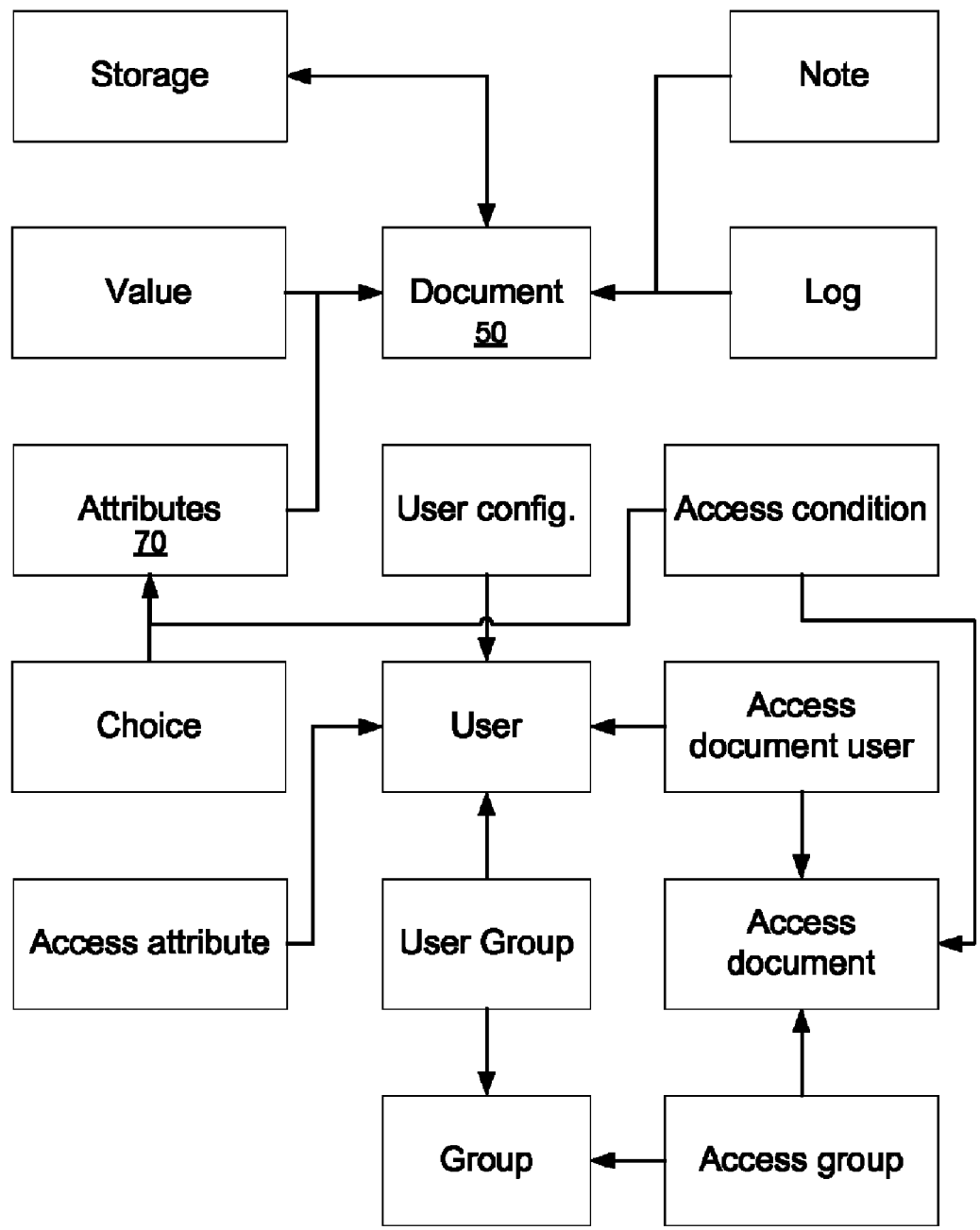
FIG. 3 is an exemplary schematic diagram of the interrelations between the document attributes and the document.
Figure 4:
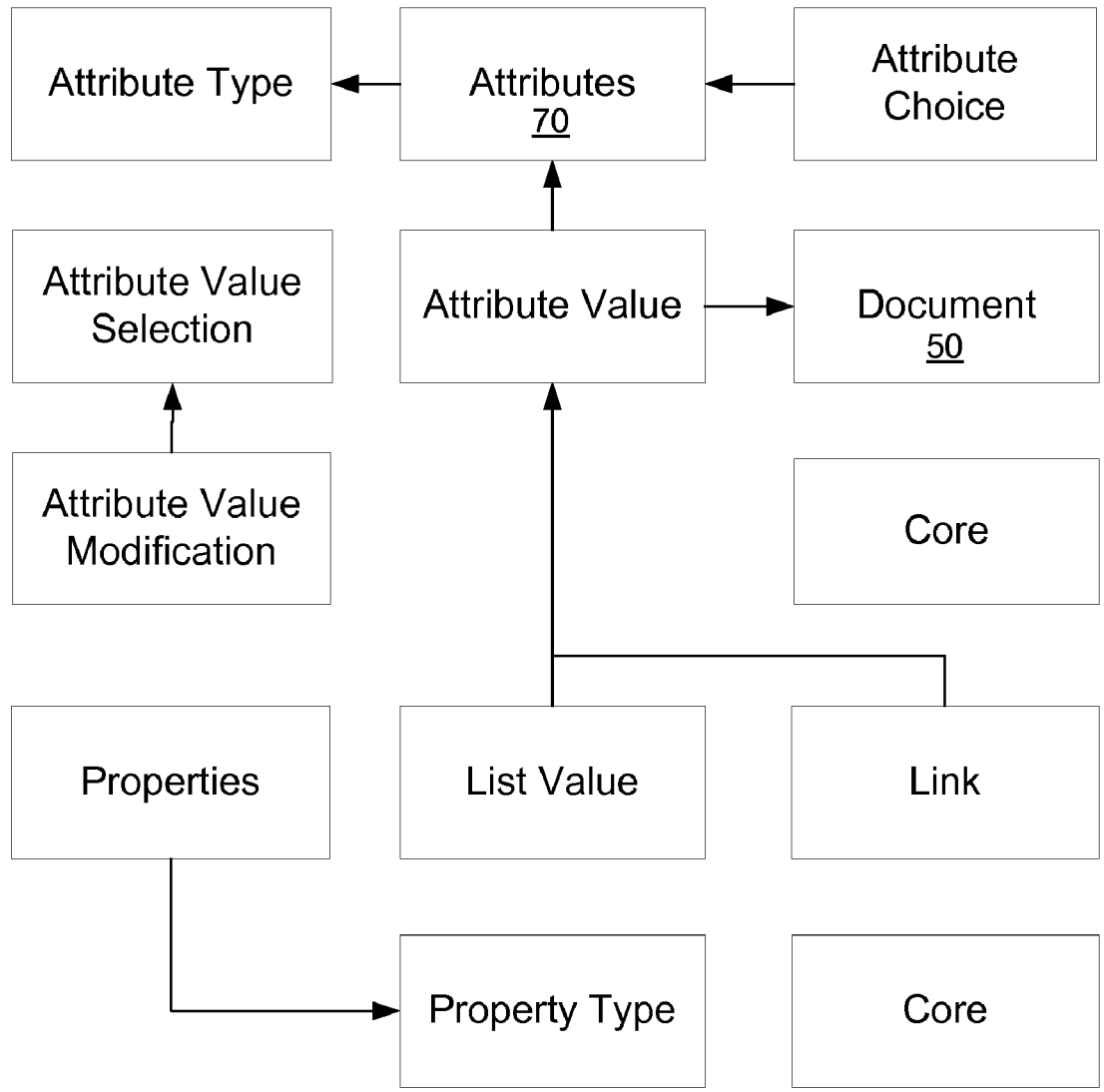
FIG. 4 is an exemplary schematic diagram of the interrelations between the document attributes and the document.

FIGS. 3 and 4 presents schematic diagrams providing more information about how, at a computer program level, the documents attributes 70 interact with the rest of the computer tool. These illustrative figures are depicting an exemplary computer application architecture among other adapted to carry on embodiments of the present invention. Alternate architectures are also suitable and will become apparent to people skilled in the art of computer architecture design. Therefore, the illustrative architecture will not be discussed in further details in the present application.

Figure 5:
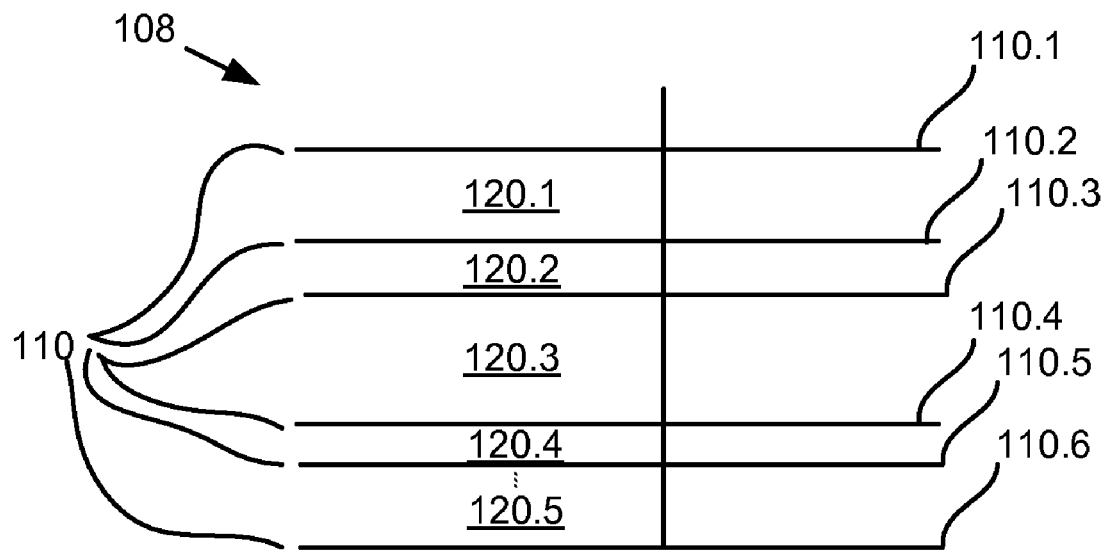
FIG. 5 is a schematic representation of an exemplary document staff in accordance with the teachings of the present invention.

Referring to FIG. 5, the staff 108 is the base on which documents 50 are disposed (please note the staff lines 110 and intervening spaces 120 applied to the document staff 108 will use a different numeral identification to prevent any confusion but, nonetheless, remain conceptually analogous to the music staff 110 and its associated staff lines 110.1-110.6 and intervening spaces 120.1-120.5). It creates an intuitive "base template" over which are disposed documents 50. As illustrated on FIG. 5, and as opposed to the musical notation, documents management does not limit or restrict the number of staff lines 110 and intervening spaces 120 between the staff lines 110. Documents might be disposed along only one line 110 or about twenty or more lines and corresponding intervening spaces (not shown, however illustratively, six staff lines 110.1 through 110.6 and five intervening spaces 120.1 through 120.5 are shown). The intervening spaces 120 between staff lines 110 might vary depending on the desired visual effect. For instance, intervening space 120.1 is larger than intervening space 120.4 thus allowing more room to present documents 50 and providing a vertically visually distinctive location on the staff 108. Staff lines 110 are respectively associated with one or more document attributes 70 to determine which documents 50 will appear on a specific staff line 110. The same logic is applicable for intervening spaces 120 between staff lines 110. This way a discriminative distribution of documents on the document staff 108 visually infers some meaning to the position of each document.

Figure 6:
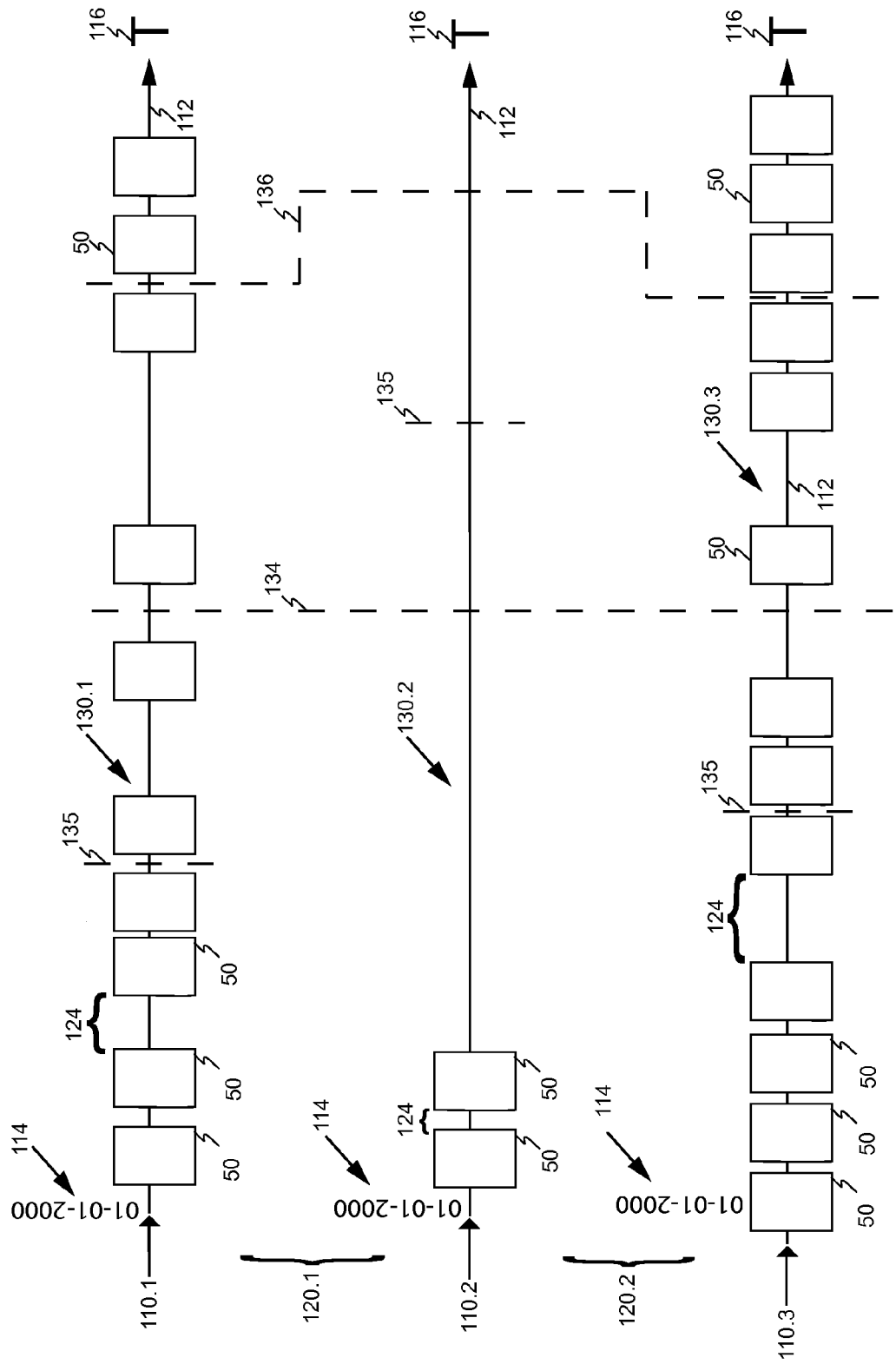
FIG. 6 depicts three staff lines according to an embodiment of the present invention.

Once document attributes 70 are associated with the respective staff lines 110 and intervening spaces 120. The number of staff lines 110 and corresponding intervening spaces 120 are defined. The documents 50 are disposed along the staff line(s) 110 and/or intervening space(s) 120 that have a similar document attribute(s) 70 associated therewith. The number of staff lines 110 can be automatically determined by the selection of document attributes 70 or predetermined groups of document attributes 70. For instance, a predetermined staff line 110 may be pre-associated with the document attributes "email", "inbox" and "not read yet". The selection of this predetermined group of document attributes will display a staff line to display the documents 50 having these document attributes 70 in common. Boolean logic can also be applied to document attributes 70. For example, as illustrated in FIG. 6, the first staff line 110.1 is associated with document attribute "user A", "file number B" and ">Jan. 1, 2000" 114. The first staff line will therefore display a group 130.1 of documents from user A, with file number B viewed between Jan. 1, 2000 and today. A comparable process happens with the second staff line 110.2 that displays a group 130.2 that is associated with a desired set of document attributes to display a group 130.2 of email documents received from user A between the same time periods. On the third staff line 110.3 will be displayed all communication 130.3 sent to clients in relation with file number B. Many other variations can be made depending on the desired object of the query. Many other additional staff lines might be added to provide a user more documents 50, each sorted in a particular manner. The result is a matrix of documents 50 disposed chronologically 116 on a series of staff lines 110.1, 110.2, 110.3. In the illustrative example shown on FIG. 6, no documents are intentionally displayed in intervening spaces between staff lines 110.1, 110.2 and 110.3.

The space 124 varies between two juxtaposed documents 50 to better represent the time at which the document 50 must be shown on the staff line 110 to provide an accurate chronological ordering on the staff line 110. Using this document notation tool, a user can figure out very fast how many documents are related with each "staff line query", where they stand in time and draw links between documents 50 on two staff lines 110. It has to be noted the staff lines 110 on FIG. 6 are represented by a line 112 helping a user to see the position of the staff line 110 guiding the disposition of the documents 50. The line 112 is visible on FIG. 6 but could also be transparent if the number of documents 50 aligned on the staff line is sufficient to figure out the position of the staff line 110 without creating confusion. Alternatively, a staff line could be a combination of two staff lines bordering a row of documents. In fact, at least one embodiment of the present invention relates to a substantially longitudinal alignment of documents inferring a staff line when viewed by a viewer. A series of substantially longitudinal alignment of documents, each inferring a staff line, is also encompassed by the present application.

Time units, like days, weeks, months and years are separated with a bar date 134 visually separating the documents 50 on a staff line 110. The bar date 110 can cross many staff lines 110 to better separate documents 50 disposed on each staff line 110. The bar date 134 will be straight if all staff lines 110 are parallel and chronologically even. Otherwise, and for illustrative example only, the bar date 134 will be either separated in different sections 135, each section 135 separating documents on one staff line, or have a non-linear shape 136 accommodating the uneven chronology of different staff lines 110. The latter being an option if the staff lines 110 are non-parallel to one another, which is encompassed by the present invention as seen on FIG. 10.

Each document 50 can be found on more than one staff line 110 and/or intervening space 120 if their associated document attribute(s) 70 are associated with more than one staff line 110 and/or intervening space 120. Each staff line 110 and/or intervening space 120 therefore provides a "graphical vector" displaying the documents having the same document attribute(s) 70 associated therewith.

Many staff lines 230, each one depicting a subset grouping of documents based on different combinations of document attribute(s), represented adjacent to one another, provides a useful way to represent a plurality of documents 150 and draw links between them that are perceivable by a user. The three staff lines 110.1, 110.2, 110.3 are juxtaposed to each other to allow a user to see at least a portion of at least two of each staff lines 110.1, 110.2, 110.3 at the same time. Seeing many staff lines 110 at a glance gives valuable information to the user by giving a view on many related documents 50 disposed in a logical order. In this illustrative example, more or less staff lines 110 can be juxtaposed to fulfill the request of a user without departing from the scope of the present invention. In the present situation we have three staff lines 110.1, 110.2, 110.3 to better accommodate the following illustrative example that does not intend to be limitative.

Real Life Examples

Patent practitioners in law firms conventionally use a three-parts file for keeping good record of a patent prosecution matter. The first part, physically on the left side of the file, is used for communications with the patent office; the second part, physically on the center of the physical file, is used to hold a copy of the specification as filed with the figures and the right side, used for communications with the client, is on the right side of the physical file. In the present illustrative example in FIG. 7, the first part is displayed on staff line 110.1 associated with document attributes ("communication with patent office" AND NOT ("specification" or "figures")), the second part is displayed on staff line 110.2 associated with the document attribute "specification documents" and the third part is displayed on staff line 110.3 associated with the document attribute "communication with the patent office". More precisely, to give a better example, the document 136 is illustratively the declaration signed by the inventor filed with the patent office, document 138 is the power of attorney and document 140 is the filling receipt received from the patent office. On staff line 110.2, document 144 is the specification as filed and document 142 is the figures as filed. On the client side, staff line 110.3 displays an invention disclosure 146 received from the client, document 148 is an acknowledgement letter sent to the client and document 150 is additional invention related information received from the client. Only the beginning of the prosecution history is detailed however the remaining of the prosecution documents is illustratively shown on FIG. 6. Each new document 50 entered in the document notation tool is associated with a number of document attributes 70 that will be used to position the document 50 at the right position on the appropriate staff line(s) 110.

Figure 7:
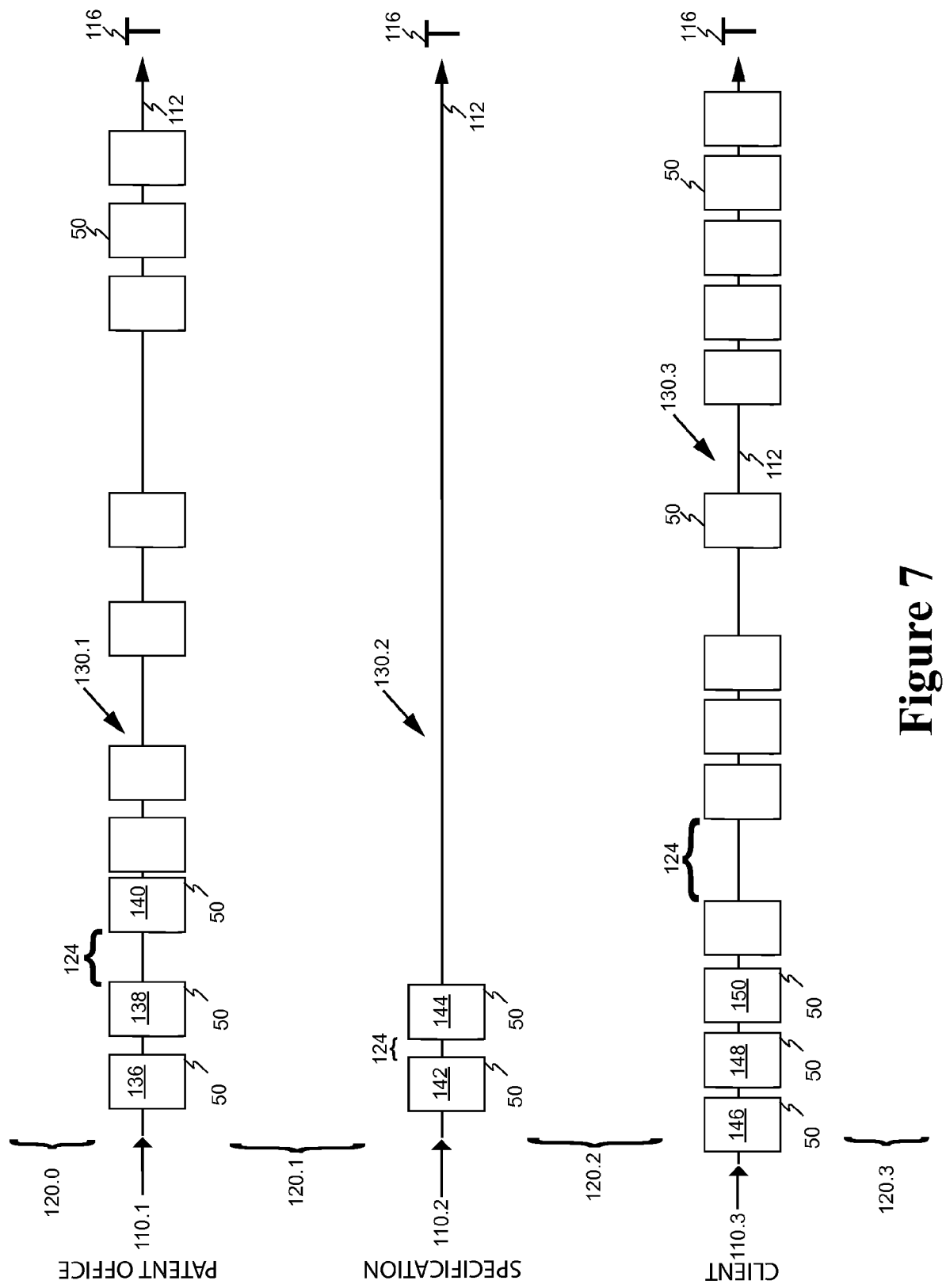
FIG. 7 depicts the three staff lines of FIG. 6 in accordance with an exemplary embodiment of the present invention.
Figure 8:
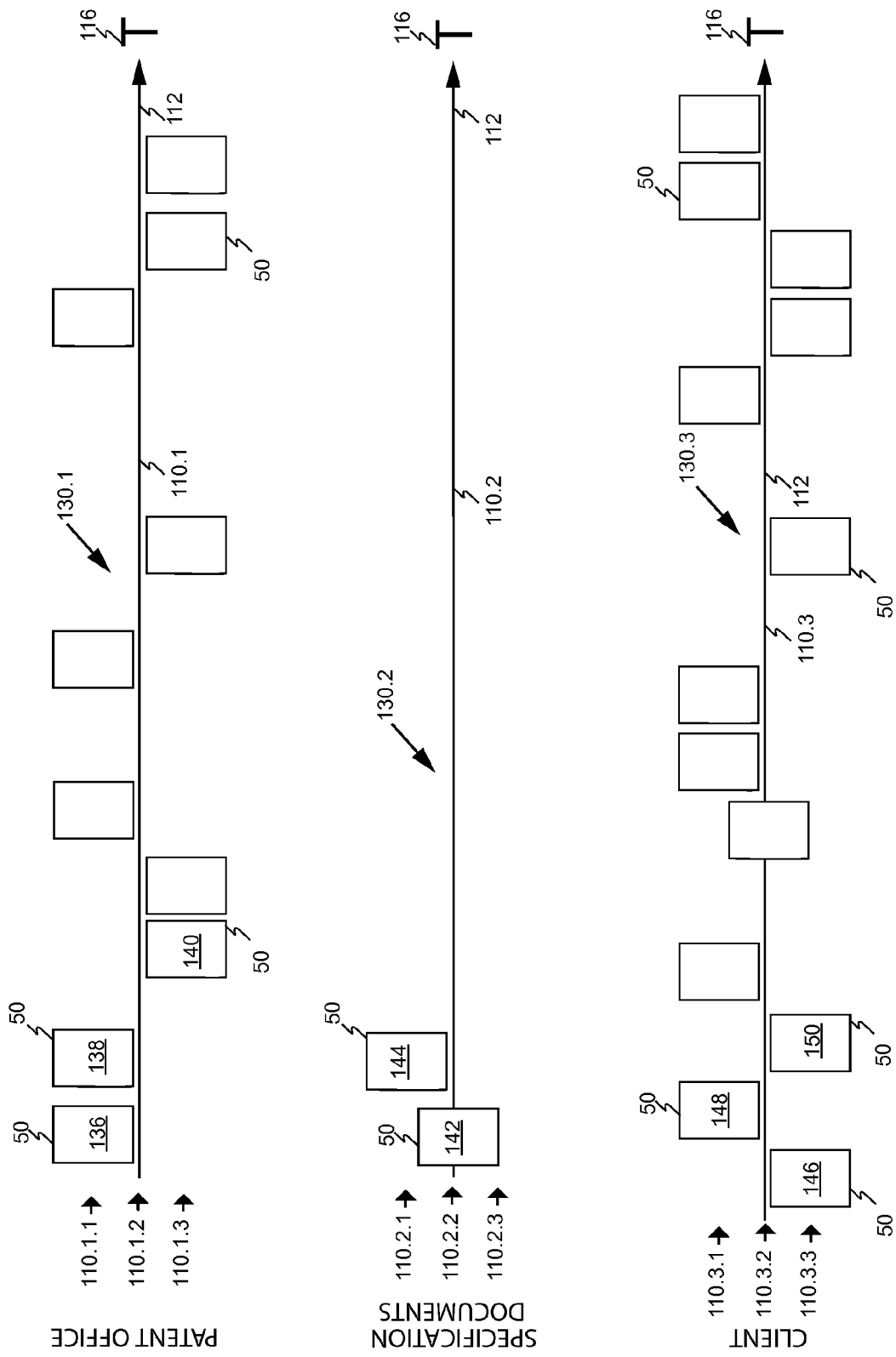
FIG. 8 depicts the three staff lines of FIG. 7 with various document alignments according to an exemplary embodiment of the present invention.

Now referring to FIG. 8, where the same three staff lines 110.1, 110.2, 110.3 from FIG. 7 can be appreciated. Staff line 110.1, which represents communications with the patent office because it is associated with the document attribute "Patent office", has been further divided into two sub-document attributes. The first sub-document attribute is "communications to the patent office", having a distinctive visual feature "above staff line" associated therewith putting these documents slightly above 110.1.1 the center of the staff line 110.1. The second sub-document attribute is "communications from the patent office" having a distinctive visual feature "below staff line" associated therewith putting these documents slightly below 110.1.3 the center of the staff line 110.1. These distinctive visual features improve the understanding of what happened (on this part of the former paper file) with the patent office by using various visual differentiators. In other words, the vertical alignment, or the indentation in respect of the staff line, of documents 136 about the staff line 110.1 are distinctive visual differentiators that are easily recognizable by a viewer like it is the case for music notation. The documents aligned on staff lines 110 with their associated distinctive visual features can be "read" by a viewer.

Staff line 110.2, that displays the original specification 144 and its appended figures 142 filed with the patent office, has been further divided into three sub-document attributes. The first document attribute "specification" has a distinctive visual feature associated therewith locates these documents slightly above 110.2.1 the center of the staff line 110.2, sub-document attribute "figures" having a distinctive visual feature associated therewith locates these documents centered 110.2.2 on the staff line 110.2 and sub-document attribute, for example, "preliminary amendment" having a distinctive visual feature associated therewith locates these documents slightly lower 110.2.3 on the staff line 110.2. But, since there are no documents associated with the latter document attribute, this sub-document attribute remains empty and no document is shown below the staff line 110.2. The distinctive visual features improve the graphical understanding of what happened on this part of the file with the patent office.

Document attribute "communications with the client" associated with staff line 110.3 has been further divided into three sub-document attributes. The first sub-document attribute "communications to the client" having a distinctive visual feature associated therewith locates these documents slightly above 110.3.1 the center of the staff line 110.3, sub-document attribute "communications with other law firms" having a distinctive visual feature associated therewith locates these documents at the center 110.3.2 of the staff line 110.3 and sub-document attribute "communication from the client" having a distinctive visual feature associated therewith locates these documents slightly lower 110.3.3 on the staff line 110.3. These distinctive visual features improve the understanding of what happened (on this part of the former physical file) with the patent office.

Figure 9:
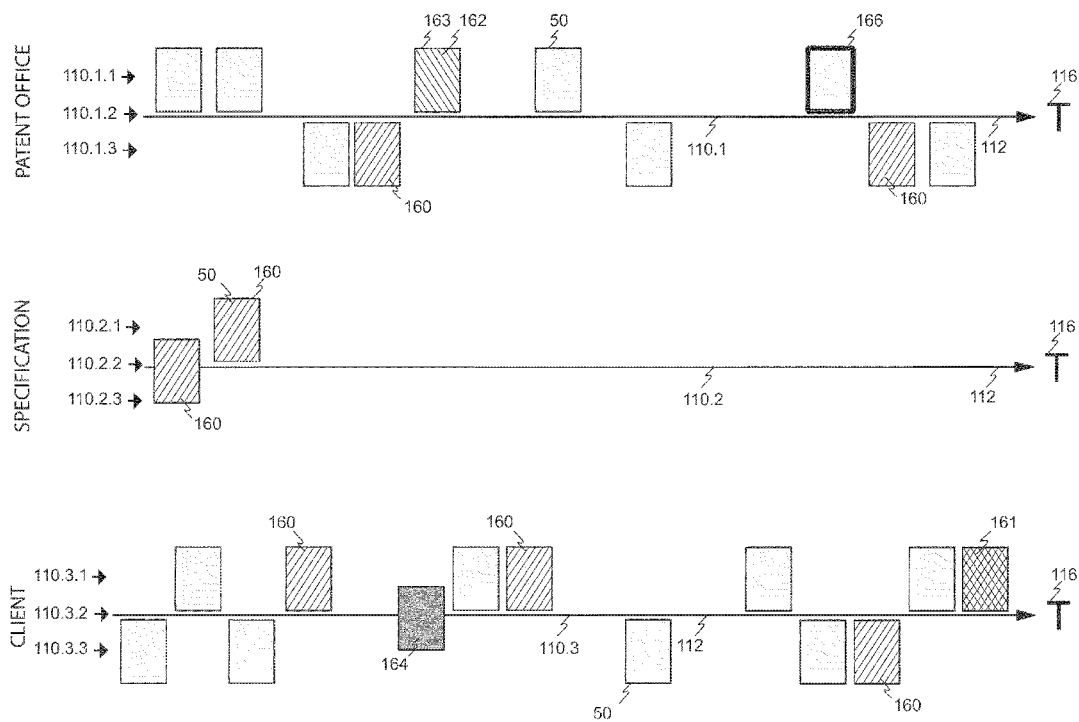
FIG. 9 depicts the three staff lines of FIG. 7 with various visual distinctive features according to an embodiment of the present invention.

Additional visual distinctive features are shown on FIG. 9. All documents 50 being PDF documents are shaded 160 thus improving the visual meaning of the documents 50 in the notation tool. Shading 162 illustratively depicts ownership transfer (document 163 being an assignment filed with the patent office). Shading 161 illustratively depicts a debit note sent to the client. Color filling 164 illustratively represents litigation related documents. Heavier frame 166 illustratively means this document has been filed with the patent office and something is awaited in return from the patent office but hasn't been received yet (a delay and a condition is associated with the visual distinctive feature applied on this document). Other distinctive visual features are within the scope of the present invention; namely, but not limited to: color, shape, size, alignment with the axis, frame size, frame thickness, frame color, icon, printed character(s) and movement. In other words, a distinctive visual feature graphically distinguishes a document from another when a document is associated with a document attribute so that a user could quickly draw links between documents by associating documents associated with similar visual features.

Figure 10:
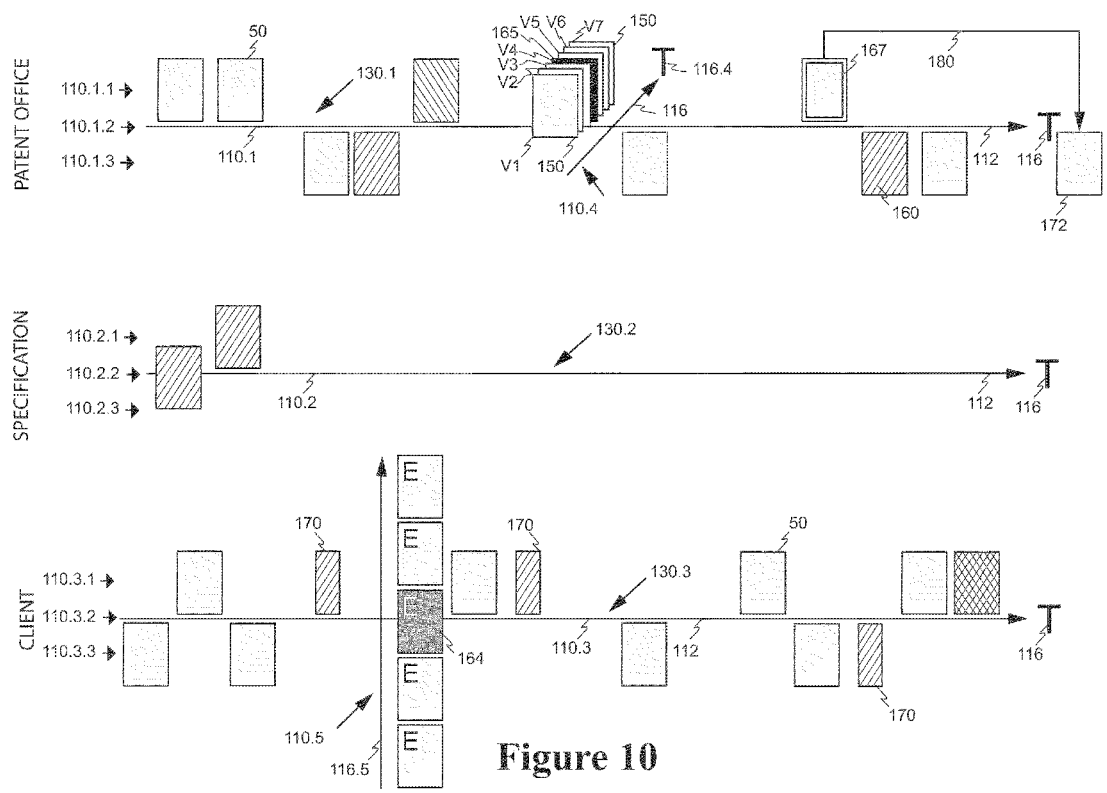
FIG. 10 depicts the three staff lines of FIG. 9 with additional staff lines according to an embodiment of the present invention.

Now referring to FIG. 10, which is substantially identical to FIG. 9 with the exception that too much e-mails to and from the client 110.3.1, 110.2.3 have been reduced in size 170 to minimize their effect on the visual of the staff line 110.3. The document having the heavier frame 166 (in FIG. 9) has received the awaited document 172 from patent office and the heavier frame 166 is now replaced by lighter frame 167 meaning the condition (receiving a document from the patent office) has been fulfilled. Element junction mark 180 ensures the user sees the connection between the two related documents 167, 172.

Another difference between FIG. 9 and FIG. 10 is the additional staff line 110.4 added on staff line 110.1 showing communications with the patent office. As it has been previously described, the staff line 110.4 represented along timeline 116.4 displays the different versions of document 165 (V4) and is represented non-parallel with the staff line 110.1 displaying various versions of a communication with the patent office. Version 1 (V1) through version 7 (V7) are shown respectively distributed on their own timeline 116.4 on each side of document 165 version 4 (V4), that is actually timely placed on the timeline 116 of the staff line 110.1, displaying the communications with the patent office 800.

The staff line 110.3 displaying the communications with the client has an intersecting staff line 110.5 displayed along timeline 116.5 that represents documents from a larger group of documents having a common document attribute "E" (the larger group of documents can be selected from all the documents or from any document subset). Staff line 110.5 has been generated based on document 164 already present on the staff line 110.3 displaying the communications with the client. A different document attribute, or a combination of document attributes (i.e. (E AND J) OR A) after Jun. 4, 2001), could have been selected and provides another subset of documents related to document 164 and disposed along staff line 110.5. To continue with the illustrative example, if document 164 is a litigation document then, if "E" is a document attribute meaning "ongoing litigation documents" (or "litigation document" with the status "active") then all documents presented along timeline 116.5 (staff line 110.5) are related to litigation documents of ongoing litigation matters. The staff line 110.5 could also be shaded accordingly if such is the desire of the user as reflected in the document attribute setup window.

The multiple parallel staff lines 230.1, 230.2, 230.3 are not limitative of the actions that can be done on each individual document on any staff lines, parallel or not. For the illustrating purpose of the present example only two non-parallel vectors 230.1.1, 230.3.1 are displayed but any other actions previously described in the present specification can be applied and generate an infinity of variations. Only parallel staff lines can be displayed and a non-parallel vector could be discretionally built and displayed simultaneously to show or put more emphasis on a specific topic identified by a corresponding attribute.

Work Management Staff Lines

Figure 11:
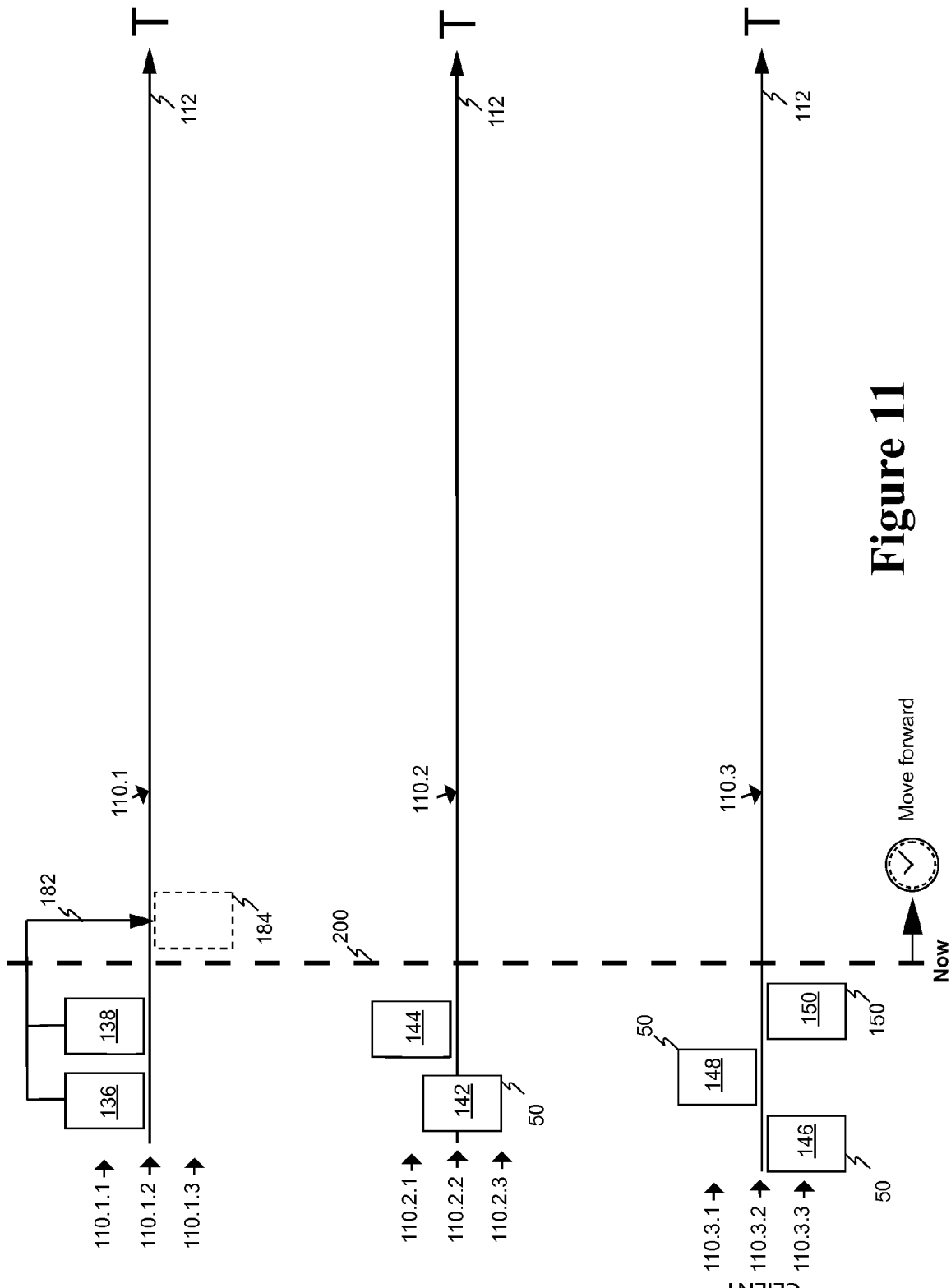
FIG. 11 depicts the three staff lines of FIG. 8 with condition and delay applied to documents according to an embodiment of the present invention.
Figure 12:
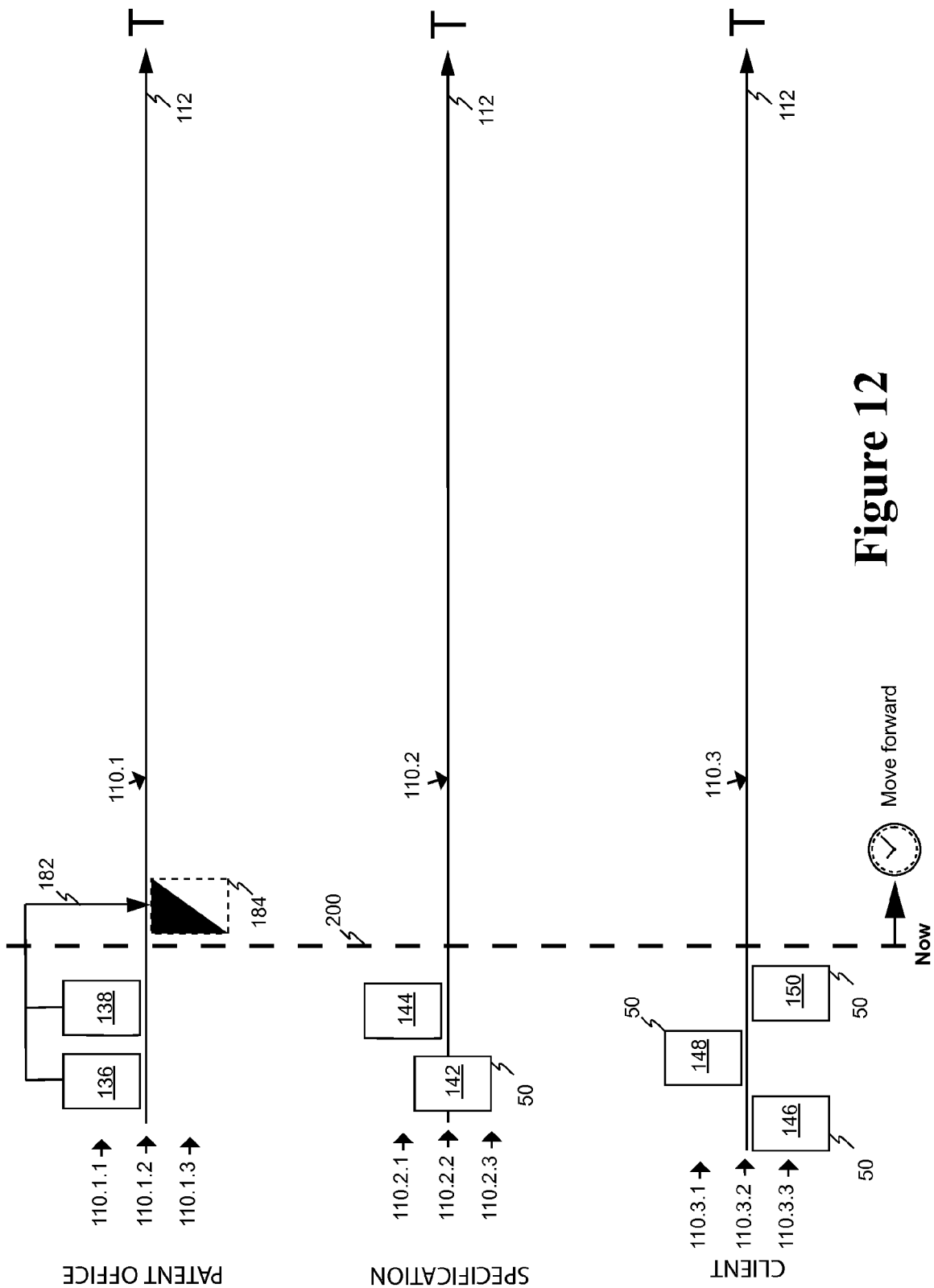
FIG. 12 depicts the three staff lines of FIG. 8 with condition and delay applied to documents according to an embodiment of the present invention.

Lets focus on the first actions performed in the prosecution of this illustrative prosecution file by looking at FIGS. 11 and 12. The element junction mark 182 associates the documents 136, 138 (declaration and power of attorney, respectively) with an expected document 184 to be received from the patent office. The expected document 184 will be received in the future; past the present moment line 200 intersecting the staff lines showing where "now" is on the timeline. The filing receipt 184 is expected later (lets assume four months) in time and is aligned with sub-document attribute "received from the patent office" 110.1.3 and has a dotted frame indicating the document has yet to be received. A delay, a condition and an action are associated with the junction mark 182. The delay is the normal expected delay for receiving the filing receipt, the condition is to enter the filing receipt in the notation tool and the action is to flag the user of the notation tool that the expected filing receipt 184 was not received within the delay. The action uses multiple strategies like changing the visual distinctive feature 185 of the expected document 184, adding the delay into a "past due" list and sending an e-mail to the user when the present moment 200 passes the due date for receiving the expected document 184. These delays, conditions, tasks and actions allow the notation tool to be used as a workflow management tool.

A series of tasks and actions can be predetermined in a specific order given, associated with conditions and delays, to replicate in the notation tool a desired chain of actions. The notation tool interconnects documents with associated actions, delays, tasks and conditions. This provides an easy to follow workflow since everything can be managed from a single system. If we continue with our patent prosecution example we can use a few example to illustrate a concrete application of a workflow management notation tool. A provisional application (multiple documents) is filed (action) in the United States patent office, a non-provisional application (multiple documents) filing (action) and other foreign filings (actions) must be done before (condition) a year from the filing date (delay based on past action) of the provisional application. Additionally, an information disclosure statement IDS must be filed before (condition and delay based on an estimated time for receiving the first office action given the estimated backlog of this Art Unit) the first office action (foreseen action receiving an document) to avoid paying the official fee (action if the previous condition is not met). If (condition) an international application PCT is filed (multiple documents associated with an action), a copy of the International Search Report ISR (document) must be filed (action) in a IDS with the United States patent office. The ISR is normally received by the sixteenth month from earliest priority date (expected delay based on the filing date of the provisional application) and a fee must be paid (action), and so on so forth. A patent agent using the notation tool could add on top of this a rule requesting to be warned of any condition not met two weeks before the due date.

Figure 13:
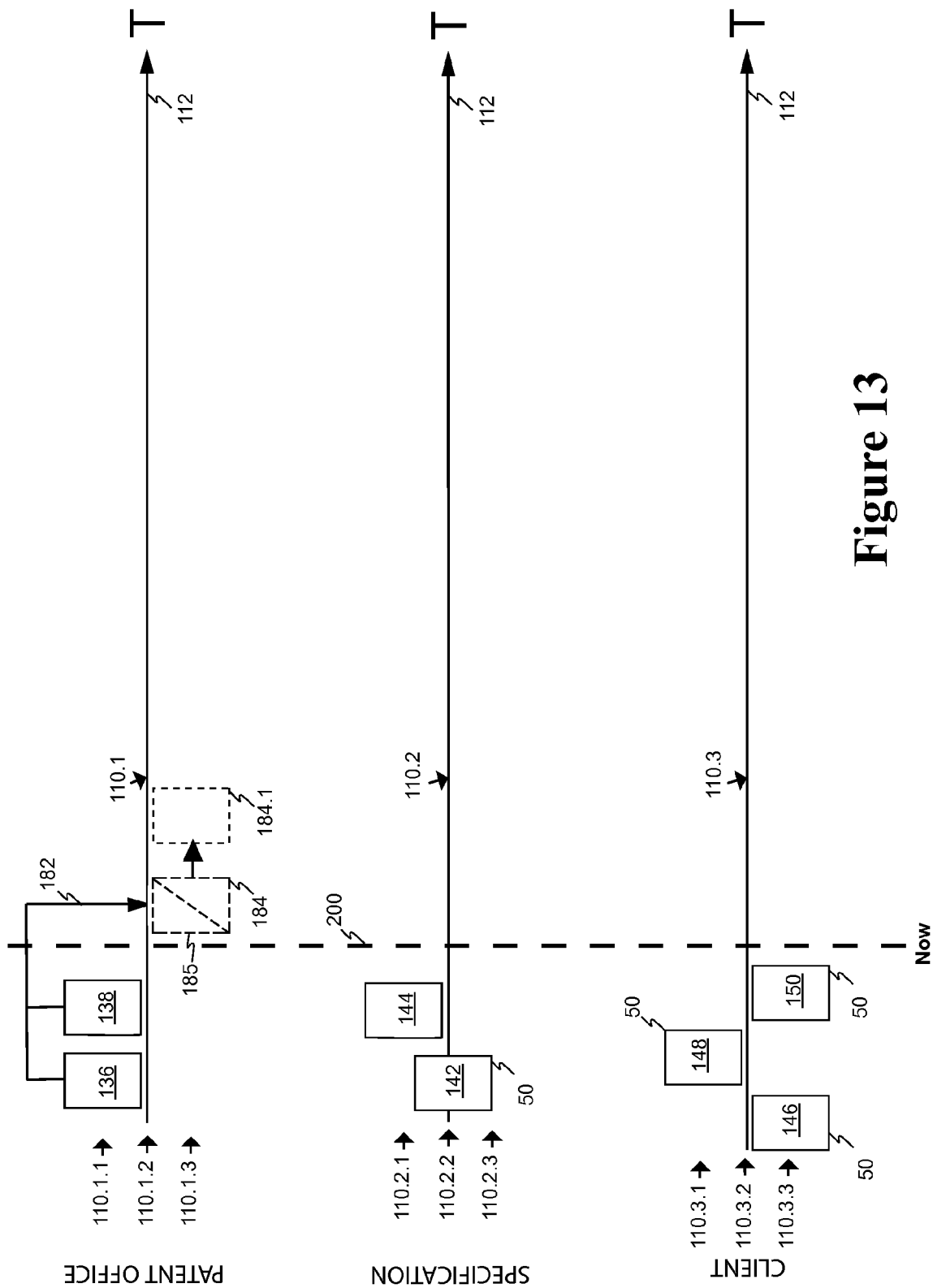
FIG. 13 depicts the three staff lines of FIG. 8 with condition and delay applied to documents according to an embodiment of the present invention.

FIG. 13 depicts the action of the user postponing the expected date by placing further in time expected document 184.1. Document 184 now has a different visual distinctive feature still showing a lighter flag distinctive visual feature 185 and a lighter frame meaning this is passed due and is replaced by a new expected date on which is aligned expected document 184.1.

Figure 14:
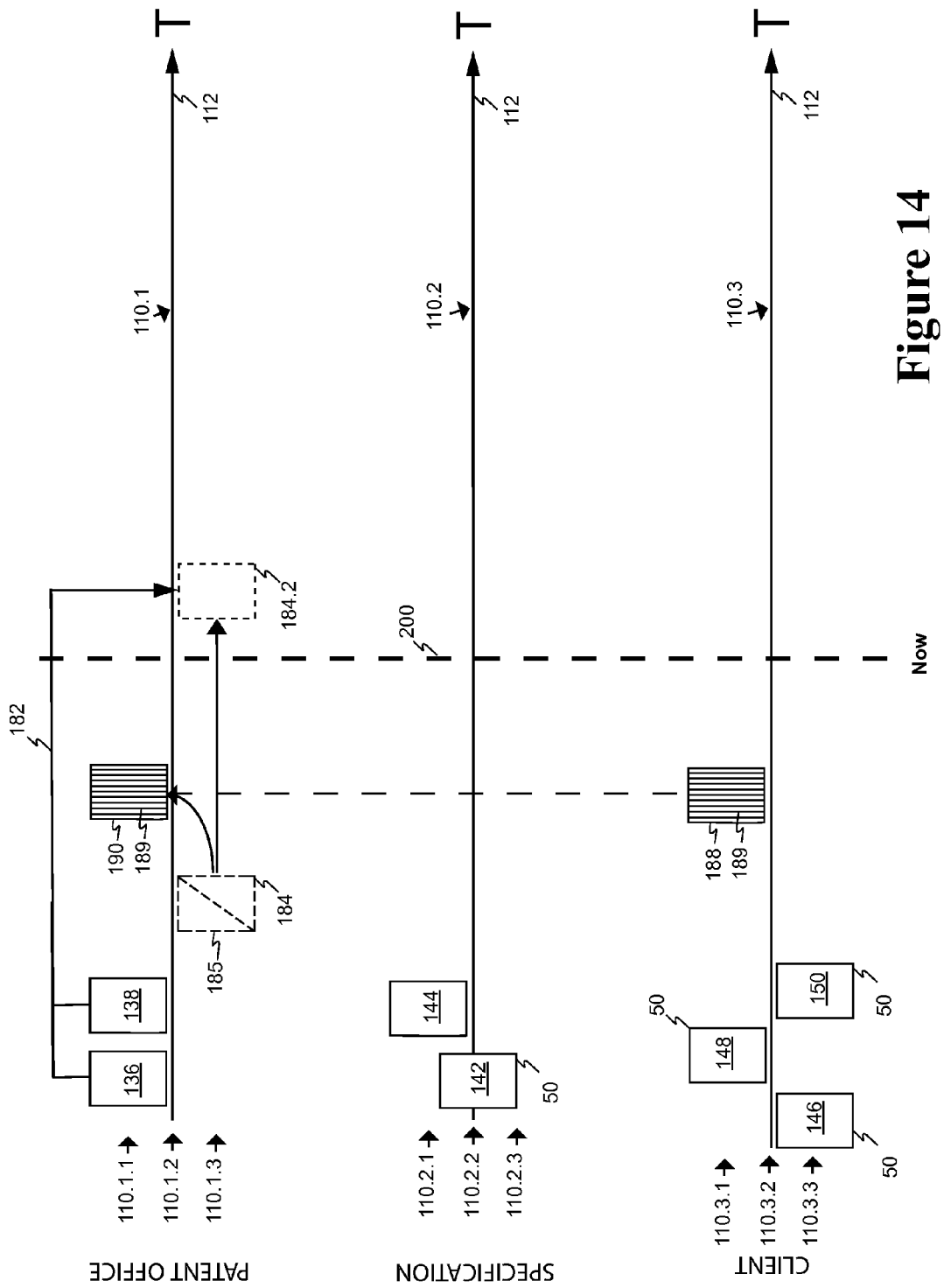
FIG. 14 depicts the three staff lines of FIG. 8 with condition and delay applied to documents according to an embodiment of the present invention.

FIG. 14 depicts the action of the user postponing the expected date by placing further in time expected document 184.2, sending a status inquiry 190 to the patent office to know why there is an unusual delay, sending a letter to the client 188 explaining there is a delay. The letter to the client 188 and the letter to the patent office 190 are related since they are both dealing with the same issue and are therefore showing the same visual distinctive feature 189 with a junction mark 178. A non-parallel staff line (not shown on FIG. 14 but like staff line 110.5 but like staff line 110.5) could have been used to search letter models to prepare the letter (document 185 sent to the patent office while keeping an eye on staff line 110.1.

Now referring to FIG. 15 illustrating an embodiment where document attributes 950 are presented along with a portion of their possible visual distinctive features, namely the document color 960, the document shading 962, the document size 964, the document frame 966, the document animation 968 and the document alignment 970 on the staff line. Each document attribute can also be selectively visible or invisible 954 on the display such that only a desired group of documents, with accordingly selected document attributes, are visible. FIG. 15 illustrates what could look like a setup window on a computer for dealing with patent prosecution related documents. "Available to client" means the documents associated with the document attribute will be made available to the client's notation tool when the client logs in its own notation tool via Internet or other client-server networks. The client will access the documents in a read only mode to prevent any alteration of the information. When the document attribute is "shared" then the other user or the group or other users will benefit of a deeper access providing access to more functions like adding notes or creating a new version. Other access related functions have been discusses earlier and still be applicable here. Each information attribute 950 is also associated with a specific staff line 952 in the case many vectors are used at the same time like in the illustrative example of FIG. 8. Communications to patent office will be associated with "staff line #1" with the visual distinctive feature "above". Similarly, all document attributes depending from the document attribute "communications to the patent office" will be automatically put on the same staff line. The same logic applies to the document attribute "communications from the patent office" is associated with "staff line #1" with the visual distinctive feature "below" and so on so forth. A dot "." before a document attribute means this document attribute is part of a larger regrouping document attribute (i.e. declaration falls under communications to the patent office). Although it is not shown on FIG. 15, more functions and visual differentiators will become apparent to skilled readers by applying the notation tool to their particular needs. The example disclosed herein are for illustrative purpose only to show possible applications of the general inventive concepts and are not intended to limit the scope of the present invention. The grey zones indicate no choice is available either because there are none or because it would conflict with another selection already made (i.e. you can't have the same document aligned above and below at the same time without risking creating confusion).

FIG. 16 illustrates the application of the notation tool for car engine technology mapping by separating the main document attributes into mechanical systems (i.e. engine, transmission, exhaust system . . . ), patent related attributes and other insightful attributes (i.e. type of file, accessed lately, viewed by . . . ). For a technology mapping the fist staff line would present all engine related patents in green when they are expired and flashing if they can still be reinstated. Transmission patents will appear on staff line #2, parallel to staff line #1, and displays only large CVT related documents. The client's patent will be displayed on staff line #3. Expired and reinstatable patents will receive the same visual treatment. PDF documents will appear with shading. Patents will be limited to US patents and blue frames will indicate which patents have been seen by another from the "shared". All notation tool functions previously described are applicable. Zooming in will provide a larger view of a portion of one vector and selecting a specific document will call the entire document with the related application to open it. Patents from Honda will be displayed above the staff lines so that they can easily be distinguished. This illustrative example shows how it becomes possible with the notation tool to easily see where are expired Honda patents related to engine, CVT transmission in relation with our client's patent. All this is done about a timeline to provide a clear distribution of all patents/documents. Many other variations can be done and are within the scope of the present invention.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A non-transitory computer-readable storage medium tangibly storing instructions that, when executed by a processor of a system, perform a method for organizing documents along a staff, the method comprising:
  selecting a first attribute;
  associating the selected first attribute with one of a staff line and a staff space;
  providing a plurality of documents having attributes associated therewith;
  searching documents from the plurality of documents to retrieve documents associated with the selected first attribute;
  displaying the retrieved documents associated with the first attribute along the associated one of a staff line and a staff space, along a timeline, in a chronological order;
  selecting a second attribute and associating the selected second attribute with a first visual distinctive feature adapted to further visually discriminate documents associated with the selected second attribute and displayed along the one of a staff line and a staff space;

selecting a third attribute and associating the selected third attribute with a second visual distinctive feature adapted to further visually discriminate the documents associated with the selected third attribute and displayed along the one of a staff line and a staff space; and displaying the retrieved documents associated with the second attribute and the third attribute with their respective associated visual distinctive features, wherein a retrieved document having the second attribute and the third attribute associated therewith is simultaneously displayed with the first and the second visual distinctive features.

2. The non-transitory computer-readable storage medium tangibly storing instructions that, when executed by a processor of a system, perform the method of claim 1, further comprising establishing a link between one of the displayed documents and an expected document; and displaying an identification of the expected document along one of the staff line and the staff space.

3. The non-transitory computer-readable storage medium tangibly storing instructions that, when executed by a processor of a system, perform the method of claim 2, wherein the expected document is located on the timeline when a reception time of the expected document is timely projected.

4. The non-transitory computer-readable storage medium tangibly storing instructions that, when executed by a processor of a system, perform the method of claim 3, further comprising a graphical identification of a present moment about the timeline and wherein the expected document is displayed on a future side of the graphical identification of the present moment.

5. The non-transitory computer-readable storage medium tangibly storing instructions that, when executed by a processor of a system, perform the method of claim 4, wherein a position of the graphical identification of the present moment moves along the timeline reflecting time that passes.

6. The non-transitory computer-readable storage medium tangibly storing instructions that, when executed by a processor of a system, perform the method of claim 5, wherein the identification of the expected document changes when the graphical identification of the present moment moves along the timeline and reaches the identification of the expected document to illustrate the expected document has not been received.

7. The non-transitory computer-readable storage medium tangibly storing instructions that, when executed by a processor of a system, perform the method of claim 2, wherein the link between the one of the displayed documents and the expected document is associated with an uncompleted action associated with the one of the documents and wherein a display of a document in replacement of the expected document would indicate the action is completed.

8. The non-transitory computer-readable storage medium tangibly storing instructions that, when executed by a processor of a system, perform the method of claim 2, further providing a graphical identification of the link between the one of the displayed documents and the expected document.

9. The non-transitory computer-readable storage medium tangibly storing instructions that, when executed by a processor of a system, perform the method of claim 8, wherein the graphical identification of the link between the one of the displayed documents and the expected document is a line.

10. The non-transitory computer-readable storage medium tangibly storing instructions that, when executed by a processor of a system, perform the method of claim 2, further changing the displayed identification of the expected document upon entry of the expected document.

11. The non-transitory computer-readable storage medium tangibly storing instructions that, when executed by a processor of a system, perform the method of claim 1, wherein one of the visual distinctive features is an orthogonal offset in respect with a staff line.

12. The non-transitory computer-readable storage medium tangibly storing instructions that, when executed by a processor of a system, perform the method of claim 1, further comprising displaying a plurality of intervening staff lines and staff spaces and wherein a staff line is transparent.

13. A machine configured to provide a user graphical interface adapted to be manipulated by a user, the user graphical interface being configured to enable a user to:

select a first attribute;

associate the selected first attribute with one of a staff line and a staff space;

provide a plurality of documents having attributes associated therewith;

search documents from the plurality of documents to retrieve documents associated with the selected first attribute;

display the retrieved documents associated with the first attribute along the one of a staff line and a staff space, along a time line, in a chronological order;

select a second attribute and associate the selected second attribute with a first visual distinctive feature adapted to further visually discriminate the displayed documents associated with the selected second attribute along the one of a staff line and a staff space;

select a third attribute and associate the selected third attribute with a second visual distinctive feature adapted to further visually discriminate the displayed documents associated with the selected third attribute along the one of a staff line and a staff space; and display the retrieved documents associated with the second attribute and the third attribute with their respective associated visual distinctive features, wherein a retrieved document having the second attribute and the third attribute associated therewith displays simultaneously the first visual distinctive feature and the second visual distinctive feature.

14. The machine of claim 13, further adapted for establishing a link between one of the displayed documents and an expected document; and displaying an identification of the expected document along one of the staff line and the staff space.

15. The machine of claim 14, wherein the expected document is located on the timeline when a reception time of the expected document is timely projected.

16. The machine of claim 15, further adapted to display a graphical identification of a present moment about the timeline and wherein the expected document is displayed on a future side of the graphical identification of the present moment.

17. A document organizing system comprising:

a memory adapted to store therein a plurality of documents;

a display adapted to display documents in a substantially linear arrangement of documents along a timeline, display graphical links between documents and expected documents, and adapted to display a present moment identification;

a time management mechanism adapted to manage the present moment identification that moves along the timeline, reflecting time that passes, on the substantially linear arrangement of documents and to send a signal when the present moment identification reaches an expected document timely disposed on the timeline; and a document relations management mechanism adapted to manage links between documents; and an attribute management mechanism adapted to
receive a signal based on the selection of a first attribute;
associate the selected first attribute with one of a staff line and a staff space;
provides a plurality of documents having attributes associated therewith; and
search documents from the plurality of documents to retrieve documents associated with the selected first attribute;

the display module being further adapted to display the retrieved documents associated with the first attribute along the one of a staff line and a staff space, along a timeline, in a chronological order;

the attribute management module being further adapted to select a second attribute and to associate the selected second attribute with a first visual distinctive feature adapted to further visually discriminate the documents associated with the selected second attribute along the one of a staff line and a staff space, select a third attribute and associate the selected third attribute with a second visual distinctive feature adapted to further visually discriminate the displayed documents associated with the selected third attribute, the display module being further adapted to display the retrieved documents associated with the second attribute and the third attribute with their respective associated visual distinctive features, wherein a retrieved document having the second visual distinctive feature and the third visual distinctive feature associated therewith simultaneously displays the second and the third visual distinctive features.

18. The document organizing system of claim 17, wherein an identification of the expected document changes when the identification of the present moment moves along the timeline and reaches the identification of the expected document to illustrate that the expected document has not been received.

19. The document organizing system of claim 17, wherein a link between one of the documents from the plurality of documents and the expected document is an uncompleted action associated with the one of the documents and wherein a display of a document in replacement of the expected document would indicate the action is completed.

* * * * *